BEST AVAILABLE COPY
DESIGN.
J. J. TOOMEY.
COMBINATION COAL AND GAS RANGE.
APPLICATION FILED APR. 2, 1920.
Reissued May 25, 1920. 14,867
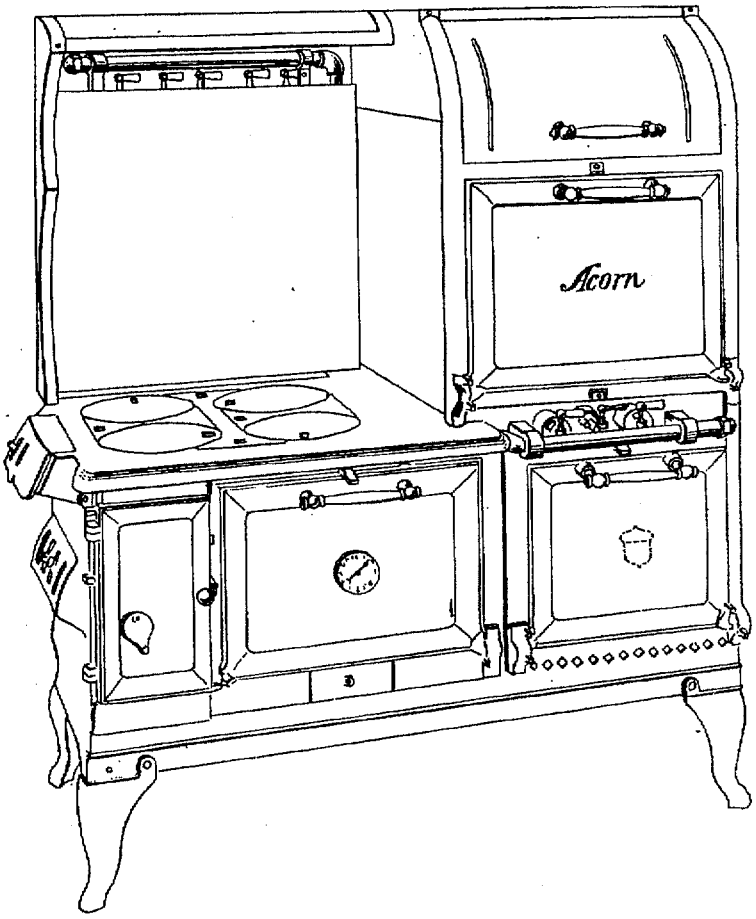
John J. Toomey Inventor
By his Attorney
Percie P. Fallon
Emma P. Pfeiffer
Mary E. Moselle

BEST AVAILABLE COPY

UNITED STATES PATENT OFFICE.

JOHN J. TOOMEY, OF CHICAGO, ILLINOIS, ASSIGNOR TO RATHBONE, SARD & CO., OF ALBANY, NEW YORK, A CORPORATION OF NEW YORK.

DESIGN FOR A COMBINATION COAL AND GAS RANGE.

14,867. Specification for Reissued Design. Reissued May 25, 1920.

Original No. 54,480, dated February 10, 1920, Serial No. 231,043, filed April 26, 1918, for 14 years. Application for reissue filed April 2, 1920. Serial No. 370,903. Term of patent 14 years.

*To all whom it may concern:*

Be it known that I, JOHN J. TOOMEY, a citizen of the United States, and residing at Chicago, in the county of Cook and State of Illinois, have invented a new, original, and ornamental Design for a Combination Coal and Gas Range, of which the following is a specification, reference being had to the accompanying drawing, forming part thereof.

The figure is a front view of a combination coal and gas range showing my new design.

The gas range is shown raised vertically to a position parallel with the back of the range and is capable of resting upon the top of the coal range in which case it constitutes the design which is shown by my companion application of even date herewith.

I claim—

The ornamental design for a combination coal and gas range as shown.

Dated, Chicago, April 8, 1918.

JOHN J. TOOMEY.

Witnesses:

THOS. H. KENDALL,
HOWARD S. SIMPSON.